United States Patent
Craig

(10) Patent No.: US 11,378,138 B2
(45) Date of Patent: Jul. 5, 2022

(54) CLUTCH ASSEMBLY

(71) Applicant: The Boeing Company, Chicago, IL (US)

(72) Inventor: Gary A. Craig, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 141 days.

(21) Appl. No.: 16/567,978

(22) Filed: Sep. 11, 2019

(65) Prior Publication Data
US 2021/0071720 A1 Mar. 11, 2021

(51) Int. Cl.
| | |
|---|---|
| F16D 13/52 | (2006.01) |
| F16D 28/00 | (2006.01) |
| F16D 13/56 | (2006.01) |
| F16D 13/71 | (2006.01) |
| F16D 13/64 | (2006.01) |
| F16D 23/04 | (2006.01) |
| F16D 13/58 | (2006.01) |
| F16D 23/00 | (2006.01) |

(52) U.S. Cl.
CPC ............ *F16D 13/52* (2013.01); *F16D 13/58* (2013.01); *F16D 23/00* (2013.01); *F16D 28/00* (2013.01); *F16D 13/56* (2013.01); *F16D 13/644* (2013.01); *F16D 13/71* (2013.01); *F16D 23/04* (2013.01)

(58) Field of Classification Search
CPC .......... F16D 13/52; F16D 28/00; F16D 13/58; F16D 23/00; F16D 13/56; F16D 13/71; F16D 13/644; F16D 23/04; F16D 23/02
See application file for complete search history.

(56) References Cited

U.S. PATENT DOCUMENTS

| | | | |
|---|---|---|---|
| 3,063,529 A * | 11/1962 | Cook | F16D 23/06 192/53.5 |
| 3,161,270 A | 12/1964 | Aschauer | |
| 4,637,272 A * | 1/1987 | Teske | F16H 25/205 74/89.26 |
| 5,333,712 A | 8/1994 | Sabee et al. | |

(Continued)

FOREIGN PATENT DOCUMENTS

DE    639397    12/1936

OTHER PUBLICATIONS

Extended European Search Report for EP Patent Application No. 20194682.9 dated Dec. 8, 2020.

*Primary Examiner* — Mark A Manley
(74) *Attorney, Agent, or Firm* — Kunzler Bean & Adamson

(57) ABSTRACT

A clutch assembly comprises an input shaft and an output shaft, co-axially arranged relative to the input shaft. The clutch assembly further comprises an input clutch drum, fixed to the input shaft, and an output clutch drum, translatable relative to the output shaft. The clutch assembly further comprises a clutch pack and a clutch piston that is translatable relative to the output shaft between, inclusively, a frictionally disengaged clutch-pack position and a frictionally engaged clutch-pack position. The clutch assembly additionally comprises a clutch-pack engagement spring. The output clutch drum is translatable between, inclusively, a fully disengaged position and, inclusively, a positively engaged position. When the clutch piston is in the frictionally disengaged clutch-pack position, the internal splines of the output clutch drum are not in mesh with the external splines of the input clutch drum.

20 Claims, 6 Drawing Sheets

(56) References Cited

U.S. PATENT DOCUMENTS

| | | | |
|---|---|---|---|
| 2016/0097430 A1* | 4/2016 | Imafuku | F16D 28/00 192/18 B |
| 2016/0377099 A1* | 12/2016 | Stauder | F15B 15/1447 92/136 |
| 2018/0031052 A1 | 2/2018 | Diemer | |
| 2018/0266493 A1* | 9/2018 | Dempfle | F16D 23/04 |
| 2018/0298998 A1* | 10/2018 | Emmons | F16H 25/205 |

\* cited by examiner

CLUTCH ASSEMBLY

TECHNICAL FIELD

The present disclosure relates to a clutch assembly for selectively transmitting torque from an input shaft to an output shaft of a power-transmission system.

BACKGROUND

Clutches are devices that selectively engage, disengage, and/or modulate power transmission between two components, e.g., rotating shafts, of a system. Some clutch arrangements transmit power by frictionally interconnecting the two components and others do so by positively engaging (locking) the two components together. In certain high-power applications, it is desirable to combine frictional-coupling and positive-engagement-coupling capabilities into a single compact, reliable, and efficient clutch assembly.

SUMMARY

Accordingly, apparatuses and methods, intended to address at least the above-identified concerns, would find utility.

The following is a non-exhaustive list of examples, which may or may not be claimed, of the subject matter, disclosed herein.

Disclosed herein is a clutch assembly that comprises an input shaft, having a central axis. The clutch assembly also comprises an output shaft, co-axially arranged relative to the input shaft. The clutch assembly further comprises an input clutch drum, comprising external splines. The input clutch drum is fixed to the input shaft so that the input clutch drum is neither rotatable nor translatable relative to the input shaft. The clutch assembly additionally comprises an output clutch drum, comprising internal splines. The output clutch drum is selectively translatable relative to the output shaft and is not rotatable relative to the output shaft. The clutch assembly further comprises a clutch pack. The clutch pack comprises first plates, selectively translatable relative to the input shaft and not rotatable relative to the input shaft. The clutch pack also comprises second plates, selectively translatable relative to the output shaft and not rotatable relative to the output shaft. The clutch assembly additionally comprises a clutch piston, not rotatable relative to the output shaft and selectively translatable relative to the output shaft between, inclusively, a frictionally disengaged clutch-pack position and a frictionally engaged clutch-pack position. The clutch assembly further comprises a clutch-pack engagement spring, interposed between the output clutch drum and the clutch piston. The output clutch drum is selectively translatable relative to the input clutch drum between, inclusively, a fully disengaged position, in which the internal splines of the output clutch drum are not in mesh with the external splines of the input clutch drum and the first plates of the clutch pack are not frictionally coupled with the second plates of the clutch pack, and, inclusively, a positively engaged position, in which the internal splines of the output clutch drum are in mesh with the external splines of the input clutch drum and the first plates of the clutch pack are frictionally coupled with the second plates of the clutch pack. When the clutch piston is in the frictionally disengaged clutch-pack position, the first plates of the clutch pack are not frictionally coupled with the second plates of the clutch pack and the internal splines of the output clutch drum are not in mesh with the external splines of the input clutch drum. When the clutch piston is in the frictionally engaged clutch-pack position, the first plates of the clutch pack are frictionally coupled with the second plates of the clutch pack.

The clutch assembly provides for engagement and disengagement of torque transmission from the input shaft to the output shaft. Frictional coupling between the first plates and the second plates of the clutch pack, when the clutch piston is in the frictionally engaged clutch-pack position, provides for transmitting relatively low torque from the input shaft to the output shaft. Meshing of the internal splines of the output clutch drum with the external splines of the input clutch drum, when the output clutch drum is in the positively engaged position, provides for transmitting relatively high torque from the input shaft to the output shaft. Accordingly, frictional coupling between the first plates and the second plates provides rotational synchronization between the input shaft and the output shaft in preparation for meshing of the internal splines of the output clutch drum with the external splines of the input clutch drum. The clutch-pack engagement spring facilitates positioning the clutch piston in the frictionally engaged clutch-pack position before the output clutch drum is translated to the positively engaged position as the output clutch drum is selectively translated from the fully disengaged position to the positively engaged position.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1:
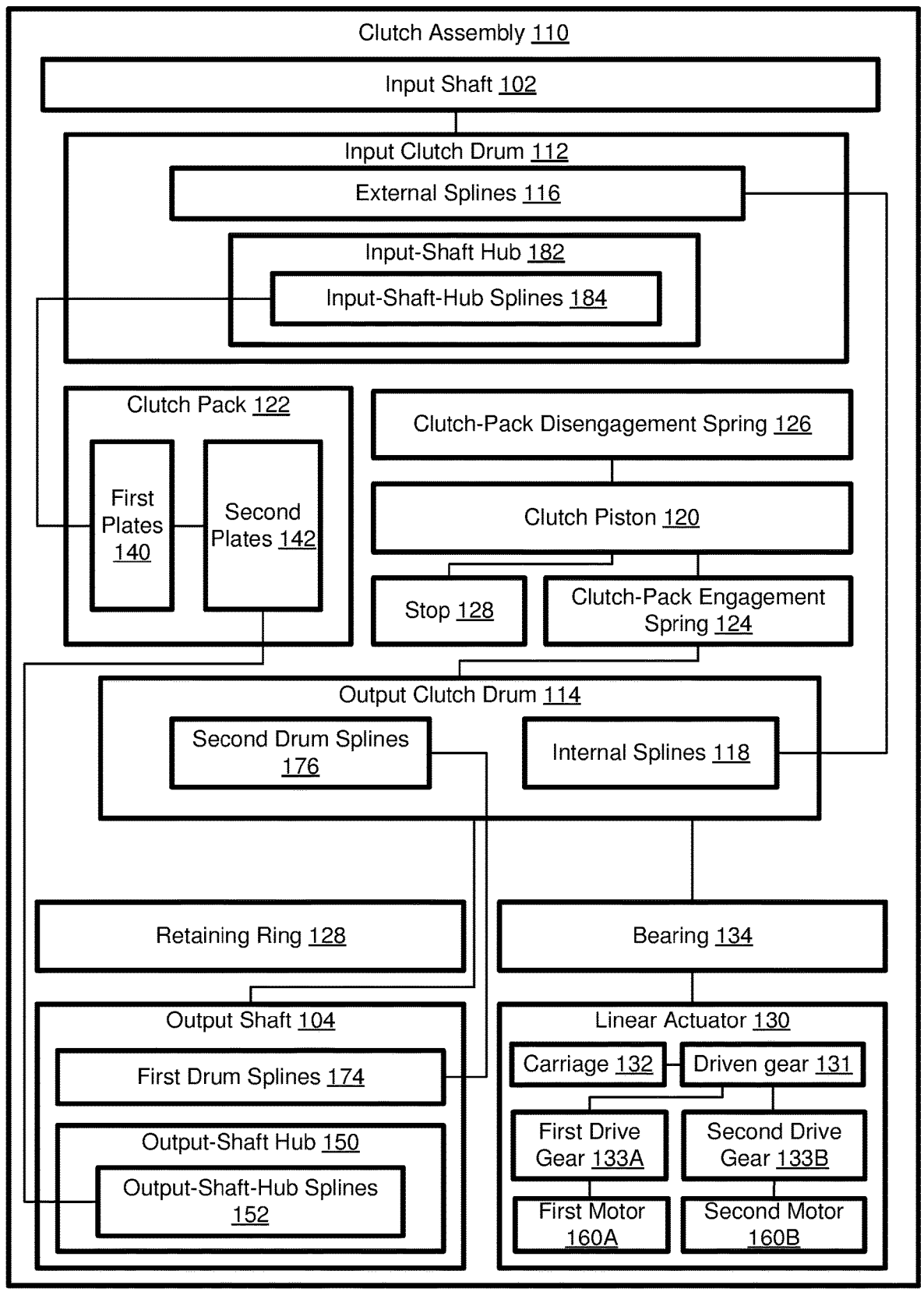
FIG. 1 is a block diagram of a clutch assembly, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter, disclosed herein, are provided below.

Figure 2:
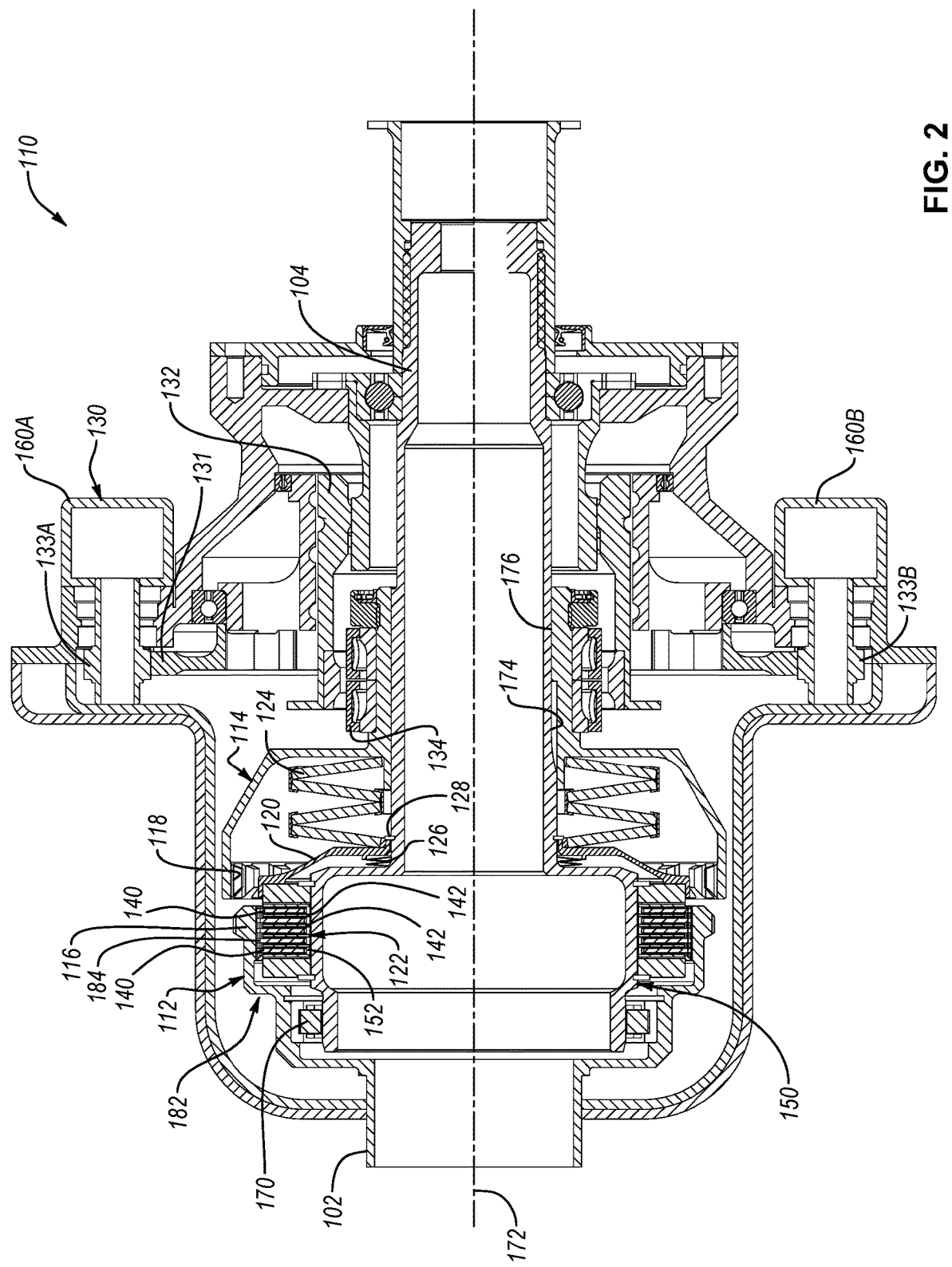
FIG. 2 is a schematic, cross-sectional side elevation view of the clutch assembly of FIG. 1, according to one or more examples of the subject matter, disclosed herein.
Figure 3:
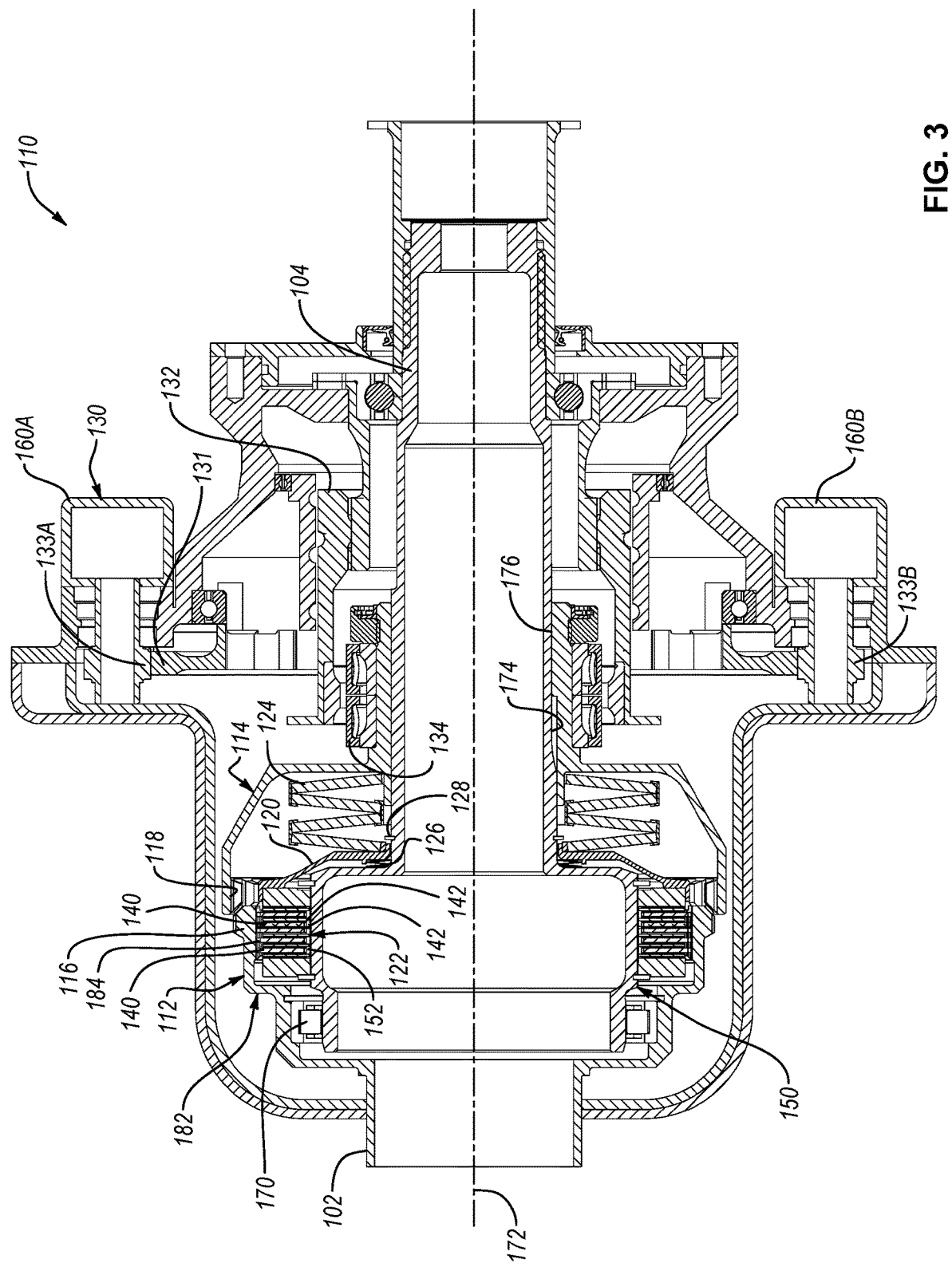
FIG. 3 is a schematic, cross-sectional side elevation view of the clutch assembly of FIG. 1, according to one or more examples of the subject matter, disclosed herein.
Figure 4:
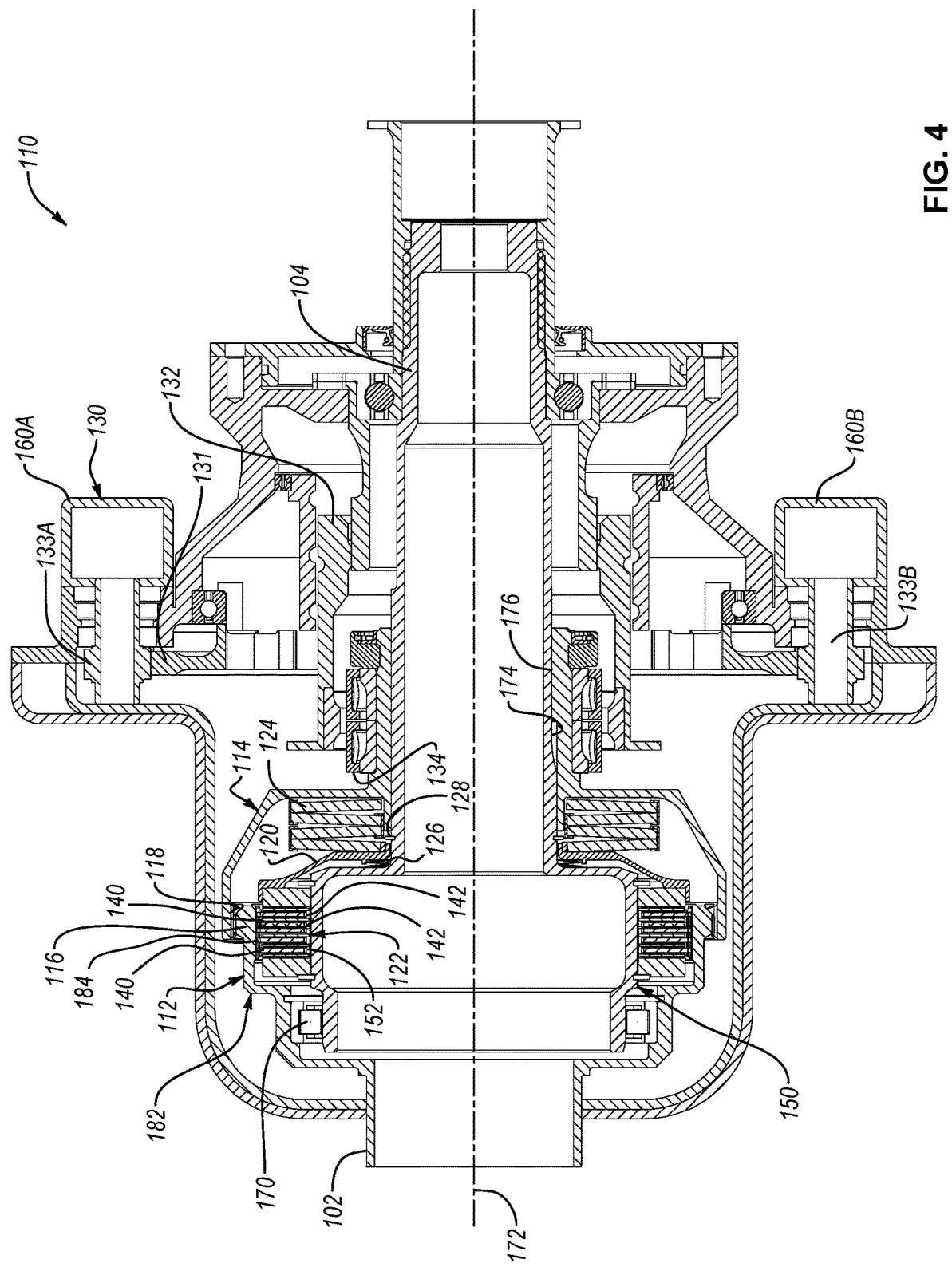
FIG. 4 is a schematic, cross-sectional side elevation view of the clutch assembly of FIG. 1, according to one or more examples of the subject matter, disclosed herein.

Referring generally to FIG. 1 and particularly to, e.g., FIGS. 2-4 for illustrative purposes only and not by way of limitation, clutch assembly 110 is disclosed. Clutch assembly 110 comprises input shaft 102, having central axis 172. Clutch assembly 110 also comprises output shaft 104, coaxially arranged relative to input shaft 102. Clutch assembly 110 further comprises input clutch drum 112, comprising external splines 116. Input clutch drum 112 is fixed to input shaft 102 so that input clutch drum 112 is neither rotatable nor translatable relative to input shaft 102. Clutch assembly 110 additionally comprises output clutch drum 114, comprising internal splines 118. Output clutch drum 114 is selectively translatable relative to output shaft 104 and is not rotatable relative to output shaft 104. Clutch assembly 110 further comprises clutch pack 122. Clutch pack 122 comprises first plates 140, selectively translatable relative to input shaft 102 and not rotatable relative to input shaft 102. Clutch pack 122 also comprises second plates 142, selectively translatable relative to output shaft 104 and not rotatable relative to output shaft 104. Clutch assembly 110 also comprises clutch piston 120, not rotatable relative to output shaft 104 and selectively translatable relative to output shaft 104 between, inclusively, a frictionally disengaged clutch-pack position and a frictionally engaged clutch-pack position. Clutch assembly 110 additionally comprises clutch-pack engagement spring 124, interposed between output clutch drum 114 and clutch piston 120. Output clutch drum 114 is selectively translatable relative to input clutch drum 112 between, inclusively, a fully disengaged position, in which internal splines 118 of output clutch drum 114 are not in mesh with external splines 116 of input clutch drum 112 and first plates 140 of clutch pack 122 are not frictionally coupled with second plates 142 of clutch pack 122, and, inclusively, a positively engaged position, in which internal splines 118 of output clutch drum 114 are in mesh with external splines 116 of input clutch drum 112 and first plates 140 of clutch pack 122 are frictionally coupled with second plates 142 of clutch pack 122. When clutch piston 120 is in the frictionally disengaged clutch-pack position, first plates 140 of clutch pack 122 are not frictionally coupled with second plates 142 of clutch pack 122 and internal splines 118 of output clutch drum 114 are not in mesh with external splines 116 of input clutch drum 112. When clutch piston 120 is in the frictionally engaged clutch-pack position, first plates 140 of clutch pack 122 are frictionally coupled with second plates 142 of clutch pack 122. The preceding content of this paragraph characterizes example 1 of the subject matter, disclosed herein.

Clutch assembly 110 provides for engagement and disengagement of torque transmission from input shaft 102 to output shaft 104. Frictional coupling between first plates 140 and second plates 142 of clutch pack 122, when clutch piston 120 is in the frictionally engaged clutch-pack position, provides for transmitting relatively low torque from input shaft 102 to output shaft 104. Meshing of internal splines 118 of output clutch drum 114 with external splines 116 of input clutch drum 112, when output clutch drum 114 is in the positively engaged position, provides for transmitting relatively high torque from input shaft 102 to output shaft 104. Accordingly, frictional coupling between first plates 140 and second plates 142 provides rotational synchronization between input shaft 102 and output shaft 104 in preparation for meshing of internal splines 118 of output clutch drum 114 with external splines 116 of input clutch drum 112. Clutch-pack engagement spring 124 facilitates positioning clutch piston 120 in the frictionally engaged clutch-pack position before output clutch drum 114 is translated to the positively engaged position as output clutch drum 114 is selectively translated from the fully disengaged position to the positively engaged position.

In one or more examples, external splines 116 of input clutch drum 112 and internal splines 118 of output clutch drum 114 each include a leading engagement edge that is oblique relative to central axis 172 of input shaft 102. The leading engagement edges of external splines 116 and internal splines 118, being oblique relative to central axis 172, provide overlapping between external splines 116 and internal splines 118, along plane perpendicular to central axis 172, before external splines 116 and internal splines 118 mesh. Accordingly, the leading engagement edges of external splines 116 and internal splines 118, being oblique relative to central axis 172, help to increase the surface area of external splines 116 and internal splines 118 that contact each other as external splines 116 and internal splines 118 initiate meshing engagement, which promotes longevity and durability of external splines 116 and internal splines 118.

According to one or more examples, input shaft 102 is driven by a torque generator, such as an internal combustion engine, and output shaft 104 is coupled with a torque absorber, such as an aircraft rotor, so that the torque absorber receives torque generated by the torque absorber when output clutch drum 114 is in the positively engaged position and/or clutch piston 120 is in the frictionally engaged clutch-pack position.

Referring generally to FIG. 1 and particularly to, e.g., FIG. 2 for illustrative purposes only and not by way of limitation, when output clutch drum 114 is in the fully disengaged position relative to input clutch drum 112, clutch piston 120 is in the frictionally disengaged clutch-pack position. The preceding content of this paragraph characterizes example 2 of the subject matter, disclosed herein, where example 2 also encompasses example 1, above.

Clutch piston 120, being in the frictionally disengaged clutch-pack position when output clutch drum 114 is in the fully disengaged position, enables relative rotation between input shaft 102 and output shaft 104, which disables transmission of torque from input shaft 102 to output shaft 104.

Referring generally to FIG. 1 and particularly to, e.g., FIG. 4 for illustrative purposes only and not by way of limitation, when output clutch drum 114 is in the positively engaged position relative to input clutch drum 112, clutch-pack engagement spring 124 is compressed between output clutch drum 114 and clutch piston 120, and clutch piston 120 is in the frictionally engaged clutch-pack position. The preceding content of this paragraph characterizes example 3 of the subject matter, disclosed herein, where example 3 also encompasses example 2, above.

Compression of clutch-pack engagement spring 124 between output clutch drum 114 and clutch piston 120 provides for applying a biasing force to clutch piston 120 such that clutch piston 120 translates from the frictionally disengaged clutch-pack position to the frictionally engaged clutch-pack position. Translating output clutch drum 114, from the fully disengaged position, toward clutch piston 120 facilitates compression of clutch-pack engagement spring 124 between output clutch drum 114 and clutch piston 120.

Referring generally to FIG. 1 and particularly to, e.g., FIG. 3 for illustrative purposes only and not by way of limitation, output clutch drum 114 is selectively translatable relative to input clutch drum 112 into an intermediate position between the fully disengaged position relative to input clutch drum 112 and the positively engaged position relative to input clutch drum 112. When output clutch drum 114 is in the intermediate position, internal splines 118 of output clutch drum 114 are not in mesh with external splines 116 of input clutch drum 112, and clutch piston 120 is in the frictionally engaged clutch-pack position. The preceding content of this paragraph characterizes example 4 of the subject matter, disclosed herein, where example 4 also encompasses example 3, above.

Output clutch drum 114, being in the intermediate position relative to input clutch drum 112, enables co-rotation of input shaft 102 and output shaft 104 for relatively low torque values and enables relative rotation of input shaft 102 and output shaft 104 for relatively high torque values. Accordingly, output clutch drum 114, being in the intermediate position relative to input clutch drum 112, enables rotational synchronization between input shaft 102 and output shaft 104 before meshing of internal splines 118 of output clutch drum 114 with external splines 116 of input clutch drum 112. The relatively low torque values are lower than the relatively high torque values.

Referring generally to FIG. 1 and particularly to, e.g., FIGS. 3 and 4 for illustrative purposes only and not by way of limitation, when output clutch drum 114 is in the intermediate position, clutch-pack engagement spring 124 is compressed a first amount between output clutch drum 114 and clutch piston 120. When output clutch drum 114 is in the positively engaged position relative to input clutch drum 112, clutch-pack engagement spring 124 is compressed a second amount between output clutch drum 114 and clutch piston 120. The second amount is greater than the first amount. The preceding content of this paragraph characterizes example 5 of the subject matter, disclosed herein, where example 5 also encompasses example 4, above.

Compression of clutch-pack engagement spring 124 from the first amount to the second amount enables output clutch drum 114 to translate from the intermediate position to the positively engaged position.

Referring generally to FIG. 1 and particularly to, e.g., FIGS. 3 and 4 for illustrative purposes only and not by way of limitation, clutch piston 120 is in the frictionally engaged clutch-pack position when output clutch drum 114 is between, inclusively, the intermediate position relative to input clutch drum 112 and, inclusively, the positively engaged position relative to input clutch drum 112. The preceding content of this paragraph characterizes example 6 of the subject matter, disclosed herein, where example 6 also encompasses examples 4 or 5, above.

Clutch piston 120, being in the frictionally engaged clutch-pack position when output clutch drum 114 is between, inclusively, the intermediate position relative to input clutch drum 112 and, inclusively, the positively engaged position relative to input clutch drum 112, facilitates rotational synchronization between input shaft 102 and output shaft 104 as output clutch drum 114 translates from the positively engaged position to the intermediate position. Maintaining rotational synchronization between input shaft 102 and output shaft 104 as output clutch drum 114 translates from the positively engaged position toward the intermediate position promotes torsional damping between input shaft 102 and output shaft 104 and responsive transitioning of output clutch drum 114 back into the positively engaged position if necessary.

Referring generally to FIG. 1 and particularly to, e.g., FIG. 2 for illustrative purposes only and not by way of limitation, clutch piston 120 is in the frictionally disengaged clutch-pack position when output clutch drum 114 is between, exclusively, the intermediate position relative to input clutch drum 112 and, inclusively, the fully disengaged position relative to input clutch drum 112. The preceding content of this paragraph characterizes example 7 of the subject matter, disclosed herein, where example 7 also encompasses any one of examples 4 to 6, above.

Clutch piston 120, being in the frictionally disengaged clutch-pack position when output clutch drum 114 is between, exclusively, the intermediate position relative to input clutch drum 112 and, inclusively, the fully disengaged position relative to input clutch drum 112, enables relative rotation between input shaft 102 and output shaft 104 as output clutch drum 114 translates between, exclusively, the intermediate position and, inclusively, the fully disengaged position.

Referring generally to FIG. 1 and particularly to, e.g., FIGS. 2-4 for illustrative purposes only and not by way of limitation, clutch assembly 110 further comprises linear actuator 130, operable to translate output clutch drum 114 relative to input clutch drum 112. The preceding content of this paragraph characterizes example 8 of the subject matter, disclosed herein, where example 8 also encompasses any one of examples 1 to 7, above.

Linear actuator 130 promotes translation of output clutch drum 114 and clutch piston 120 with a single actuator, which helps to simplify clutch assembly 110.

Referring generally to FIG. 1 and particularly to, e.g., FIGS. 2-4 for illustrative purposes only and not by way of limitation, linear actuator 130 comprises carriage 132, selectively translatable relative to output shaft 104. Output clutch drum 114 is not translatable relative to carriage 132 and is rotatable relative to carriage 132. Linear actuator 130 also comprises driven gear 131, selectively rotatable relative to carriage 132 and coupled to carriage 132 so that rotation of driven gear 131 relative to carriage 132 translates carriage 132 relative to output shaft 104. Linear actuator 130 further comprises drive gear 133A, in mesh with driven gear 131. Linear actuator 130 additionally comprises motor 160A, operable to rotate drive gear 133A. The preceding content of this paragraph characterizes example 9 of the subject matter, disclosed herein, where example 9 also encompasses example 8, above.

Carriage 132 provides for translational movement of output clutch drum 114 relative to output shaft 104 while enabling output clutch drum 114 to rotate relative to carriage 132. Driven gear 131, drive gear 133A, and motor 160A provide for precise and reliable translational actuation of carriage 132.

In one or more examples, driven gear 131 and carriage 132 form a worm-gear assembly where driven gear 131 is the worm wheel and carriage 132 is the worm. Accordingly, driven gear 131 meshes with carriage 132 to translationally move carriage 132 relative to output shaft 104. In one or more examples, drive gear 133A is a spur gear and motor 160A is any one of an electrically powered motor, a pneumatically-powered motor, a hydraulically-powered motor, and the like.

Referring generally to FIG. 1 and particularly to, e.g., FIGS. 2-4 for illustrative purposes only and not by way of limitation, linear actuator 130 further comprises second drive gear 133B, in mesh with driven gear 131. Linear actuator 130 additionally comprises second motor 160B, operable to rotate second drive gear 133B. The preceding content of this paragraph characterizes example 10 of the subject matter, disclosed herein, where example 10 also encompasses example 9, above.

Driven gear 131, second drive gear 133B, and second motor 160B provide for precise and reliable translational actuation of carriage 132.

In one or more examples, second drive gear 133B is a spur gear and second motor 160B is any one of an electrically powered motor, a pneumatically-powered motor, a hydraulically-powered motor, and the like. Second motor 160B is separate from motor 160A and, in one or more examples, is independently operable relative to motor 160A.

Referring generally to FIG. 1 and particularly to, e.g., FIGS. 2-4 for illustrative purposes only and not by way of limitation, motor 160A is selectively operable to rotate drive gear 133A so that driven gear 131 is rotated in a first rotational direction and carriage 132 is translated relative to output shaft 104 in a first direction along central axis 172 and is selectively operable to rotate drive gear 133A so that driven gear 131 is rotated in a second rotational direction and carriage 132 is translated relative to output shaft 104 in a second direction along central axis 172. Second motor 160B is selectively operable to rotate second drive gear 133B so that driven gear 131 is rotated in the first rotational direction and carriage 132 is translated relative to output shaft 104 in the first direction along central axis 172 and is selectively operable to rotate second drive gear 133B so that driven gear 131 is rotated in the second rotational direction and carriage 132 is translated relative to output shaft 104 in the second direction along central axis 172. The first rotational direction and the second rotational direction are opposite to each other. The first direction and the second direction are opposite to each other. Motor 160A and second motor 160B are only operable synchronously with each other. The preceding content of this paragraph characterizes example 11 of the subject matter, disclosed herein, where example 11 also encompasses example 10, above.

Synchronous operation of motor 160A and second motor 160B to enable rotation of driven gear 131 in the first rotational direction and the second operational direction promote the use of two smaller motors rather than one large motor, which helps to reduce the size of clutch assembly 110. Additionally, synchronous operation of motor 160A and second motor 160B to enable rotation of driven gear 131 in the first rotational direction and the second operational direction provides counterbalancing forces acting on driven gear 131, which can help with stability of driven gear 131.

Each of motor 160A and second motor 160B can be a bidirectional motor.

Referring generally to FIG. 1 and particularly to, e.g., FIGS. 2-4 for illustrative purposes only and not by way of limitation, motor 160A is operable to rotate drive gear 133A so that driven gear 131 is rotated in a first rotational direction and carriage 132 is translated relative to output shaft 104 in a first direction along central axis 172. Second motor 160B is operable to rotate second drive gear 133B so that driven gear 131 is rotated in a second rotational direction and carriage 132 is translated relative to output shaft 104 in a second direction along central axis 172. The first rotational direction and the second rotational direction are opposite to each other. The first direction and the second direction are opposite to each other. Motor 160A and second motor 160B are only operable asynchronously with each other. The preceding content of this paragraph characterizes example 12 of the subject matter, disclosed herein, where example 12 also encompasses example 10, above.

Asynchronous operation of motor 160A to enable rotation of driven gear 131 in the first rotational direction and second motor 160B to enable rotation of driven gear 131 in the second operational direction help reduce complexity in the controls and type of motors used for motor 160A and second motor 160B.

Each of motor 160A and second motor 160B can be a unidirectional motor.

Referring generally to FIG. 1 and particularly to, e.g., FIGS. 2-4 for illustrative purposes only and not by way of limitation, when second motor 160B is disabled, motor 160A is selectively operable to rotate drive gear 133A so that driven gear 131 is rotated in a first rotational direction and carriage 132 is translated relative to output shaft 104 in a first direction along central axis 172. Additionally, when second motor 160B is disabled, motor 160A is selectively operable to rotate drive gear 133A so that driven gear 131 is rotated in a second rotational direction and carriage 132 is translated relative to output shaft 104 in a second direction along central axis 172. Furthermore, when second motor 160B is disabled, the first rotational direction and the second rotational direction are opposite to each other, and the first direction and the second direction are opposite to each other. The preceding content of this paragraph characterizes example 13 of the subject matter, disclosed herein, where example 13 also encompasses example 10, above.

Motor 160A, being selectively operable to rotate drive gear 133A so that driven gear 131 is rotated in the first rotational direction and to rotate drive gear 133A so that driven gear 131 is rotated in the second rotational direction when second motor 160B is disabled, provides redundancy in operation of clutch assembly 110, which helps to promote reliability of clutch assembly 110.

In one or more examples, second motor 160B is selectively operable to rotate second drive gear 133B so that driven gear 131 is rotated in the first rotational direction and carriage 132 is translated relative to output shaft 104 in the first direction along central axis 172 and to rotate second drive gear 133B so that driven gear 131 is rotated in the second rotational direction and carriage 132 is translated relative to output shaft 104 in the second direction along central axis 172 when motor 160A is disabled.

Referring generally to FIG. 1 and particularly to, e.g., FIGS. 2-4 for illustrative purposes only and not by way of limitation, motor 160A is operated so that driven gear 131 is rotated by drive gear 133A in either the first rotational direction or in the second rotational direction. Second drive gear 133B is rotated by driven gear 131. Drive gear 133A and second drive gear 133B rotate in identical directions. The preceding content of this paragraph characterizes example 14 of the subject matter, disclosed herein, where example 14 also encompasses example 13, above.

Second drive gear 133B, being rotated by driven gear 131, promotes freewheeling of second drive gear 133B as motor 160A is operated to rotate drive gear 133A and driven gear 131.

Referring generally to FIG. 1 and particularly to, e.g., FIGS. 2-4 for illustrative purposes only and not by way of limitation, clutch assembly 110 further comprises bearing 134, interposed between carriage 132 and output clutch drum 114 and configured to enable rotation of carriage 132 relative to output clutch drum 114. The preceding content of this paragraph characterizes example 15 of the subject matter, disclosed herein, where example 15 also encompasses any one of examples 10 to 14, above.

Bearing 134 helps to reduce friction between carriage 132 and output clutch drum 114 as output clutch drum 114 rotates relative to carriage 132.

In one or more examples, bearing 134 is a duplex bearing set.

Referring generally to FIG. 1 and particularly to, e.g., FIGS. 2-4 for illustrative purposes only and not by way of limitation, linear actuator 130 is selectively operable to translate output clutch drum 114 between, inclusively, the fully disengaged position relative to input clutch drum 112 and, inclusively, the positively engaged position relative to input clutch drum 112. The preceding content of this paragraph characterizes example 16 of the subject matter, disclosed herein, where example 16 also encompasses any one of examples 8 to 15, above.

Linear actuator 130 promotes translation of output clutch drum 114 between, inclusively, the fully disengaged position relative to input clutch drum 112 and, inclusively, the positively engaged position relative to input clutch drum 112 with a single actuator, which helps to simplify clutch assembly 110.

Referring generally to FIG. 1 and particularly to, e.g., FIGS. 2-4 for illustrative purposes only and not by way of limitation, when output clutch drum 114 translates relative to output shaft 104 from the fully disengaged position relative to input clutch drum 112 to the positively engaged position relative to input clutch drum 112, clutch piston 120 translates relative to output shaft 104 from the frictionally disengaged clutch-pack position to the frictionally engaged clutch-pack position. The preceding content of this paragraph characterizes example 17 of the subject matter, disclosed herein, where example 17 also encompasses any one of examples 1 to 16, above.

Clutch piston 120, translating relative to output shaft 104 from the frictionally disengaged clutch-pack position to the frictionally engaged clutch-pack position when output clutch drum 114 translates relative to output shaft 104 from the fully disengaged position relative to input clutch drum 112 to the positively engaged position relative to input clutch drum 112, promotes synchronization between input shaft 102 and output shaft 104 before internal splines 118 of output clutch drum 114 mesh with external splines 116 of input clutch drum 112.

Referring generally to FIG. 1 and particularly to, e.g., FIGS. 2-4 for illustrative purposes only and not by way of limitation, clutch assembly 110 further comprises clutch-pack disengagement spring 126, interposed between clutch piston 120 and output shaft 104 along central axis 172 and configured to apply a first biasing force to clutch piston 120 in a first direction along central axis 172. Clutch-pack engagement spring 124 is configured to apply a second biasing force to clutch piston 120 in a second direction along central axis 172, opposite the first direction. The preceding content of this paragraph characterizes example 18 of the subject matter, disclosed herein, where example 18 also encompasses any one of examples 1 to 17, above.

Clutch-pack disengagement spring 126 facilitates positioning of clutch piston 120 into the frictionally engaged clutch-pack position before output clutch drum 114 is positioned into the positively engaged position by compressing to allow clutch piston 120 to translate into the frictionally engaged clutch-pack position under a predetermined biasing force from clutch-pack engagement spring 124. Additionally, clutch-pack disengagement spring 126 helps to frictionally decouple first plates 140 and second plates 142 of clutch pack 122 when output clutch drum 114 translates from the intermediate position toward the fully disengaged position by urging clutch piston 120 from the frictionally engaged clutch-pack position to the frictionally disengaged clutch-pack position.

Referring generally to FIG. 1 and particularly to, e.g., FIGS. 2-4 for illustrative purposes only and not by way of limitation, clutch-pack engagement spring 124 has a first spring constant. Clutch-pack disengagement spring 126 has a second spring constant. The first spring constant is different from the second spring constant. The preceding content of this paragraph characterizes example 19 of the subject matter, disclosed herein, where example 19 also encompasses example 18, above.

The first spring constant of clutch-pack engagement spring 124, being different from (e.g., greater than) the second spring constant of clutch-pack disengagement spring 126, provides for clutch-pack disengagement spring 126 compressing, to allow clutch piston 120 to translate into the frictionally engaged clutch-pack position, when a predetermined biasing force from clutch-pack engagement spring 124 is applied to clutch piston 120.

Referring generally to FIG. 1 and particularly to, e.g., FIGS. 2-4 for illustrative purposes only and not by way of limitation, when output clutch drum 114 is in the fully disengaged position relative to input clutch drum 112, the first biasing force is greater than the second biasing force. When clutch piston 120 is in the frictionally engaged clutch-pack position, the first biasing force is less than the second biasing force by a first amount. When output clutch drum 114 is in the positively engaged position relative to input clutch drum 112, the first biasing force is less than the second biasing force by a second amount. The first amount is less than the second amount. The preceding content of this paragraph characterizes example 20 of the subject matter, disclosed herein, where example 20 also encompasses examples 18 or 19, above.

The first biasing force, being greater than the second biasing force when output clutch drum 114 is in the fully disengaged position, ensures clutch piston 120 is in frictionally disengaged clutch-pack position. The first biasing force, being less than the second biasing force when clutch piston 120 is in the frictionally engaged clutch-pack position and when output clutch drum 114 is in the positively engaged position, ensures clutch piston 120 is in frictionally engaged clutch-pack position. The first amount of difference between the first biasing force and the second biasing force, being less than the second amount of difference between the first biasing force and the second biasing force, provides for the further compression of clutch-pack engagement spring 124 by output clutch drum 114 as output clutch drum 114 translates from the intermediate position to the positively engaged position.

Referring generally to FIG. 1 and particularly to, e.g., FIGS. 2-4 for illustrative purposes only and not by way of limitation, clutch-pack disengagement spring 126 is a first Belleville spring. Clutch-pack engagement spring 124 is a second Belleville spring. The first Belleville spring is different from the second Belleville spring. The preceding content of this paragraph characterizes example 21 of the subject matter, disclosed herein, where example 21 also encompasses any one of examples 18 to 20, above.

Clutch-pack disengagement spring 126, being a first Belleville spring, and clutch-pack engagement spring 124, being a second Belleville spring, provides for reliably transmitting concentric loads in a small installation space. The first Belleville spring, being different from the second Belleville spring, promotes a difference in the biasing forces, applied by the respective first Belleville spring and the second Belleville spring.

In one or more examples, each of the first Belleville spring and the second Belleville spring is a coned-disc spring, conical spring washer, disc spring, or cupped spring washer. Moreover, each of the first Belleville spring and the second Belleville spring can include one or multiple back-to-back washers.

Referring generally to FIG. 1 and particularly to, e.g., FIGS. 2-4 for illustrative purposes only and not by way of limitation, clutch assembly 110 further comprises retaining ring 128, which is not translatable relative to output shaft 104. Retaining ring 128 prevents translational movement of clutch piston 120 relative to output shaft 104 in the first direction along central axis 172 when clutch piston 120 is in the frictionally disengaged clutch-pack position. The preceding content of this paragraph characterizes example 22 of the subject matter, disclosed herein, where example 22 also encompasses any one of examples 18 to 21, above.

Retaining ring 128 helps keep clutch piston 120 close to clutch pack 122 when clutch piston 120 is in the frictionally disengaged clutch-pack position, which promotes responsiveness of clutch assembly 110.

Referring generally to FIG. 1 and particularly to, e.g., FIGS. 2-4 for illustrative purposes only and not by way of limitation, input shaft 102 comprises input-shaft hub 182, which comprises input-shaft-hub splines 184. Input-shaft-hub splines 184 are engaged with first plates 140 of clutch pack 122 to prevent rotation of first plates 140 relative to input shaft 102. Output shaft 104 comprises output-shaft hub 150, which comprises output-shaft-hub splines 152. Output-shaft-hub splines 152 are engaged with second plates 142 of clutch pack 122 to prevent rotation of second plates 142 relative to output clutch drum 114. Clutch-pack disengagement spring 126 is interposed between clutch piston 120 and output-shaft hub 150 of output shaft 104. The preceding content of this paragraph characterizes example 23 of the subject matter, disclosed herein, where example 23 also encompasses any one of examples 18 to 22, above.

First plates 140, being engaged with input-shaft-hub splines 184, and second plates 142, being engaged with output-shaft-hub splines 152, facilitate co-rotation of input shaft 102 and output shaft 104 when first plates 140 are frictionally coupled with second plates 142.

Referring generally to FIG. 1 and particularly to, e.g., FIG. 2 for illustrative purposes only and not by way of limitation, when output clutch drum 114 is in the fully disengaged position relative to input clutch drum 112, a force, applied to output clutch drum 114 by clutch-pack engagement spring 124 along central axis 172 is less than a force, applied to output clutch drum 114 by clutch-pack disengagement spring 126 along central axis 172. The preceding content of this paragraph characterizes example 24 of the subject matter, disclosed herein, where example 24 also encompasses any one of examples 18 to 23, above.

The force, applied to output clutch drum 114 by clutch-pack engagement spring 124, being less than the force, applied to output clutch drum 114 by clutch-pack disengagement spring 126, when output clutch drum 114 is in the fully disengaged position, provides for preventing output clutch drum 114 from translating out of fully disengaged position.

Referring generally to FIG. 1 and particularly to, e.g., FIGS. 2-4 for illustrative purposes only and not by way of limitation, clutch-pack engagement spring 124 is within output clutch drum 114. The preceding content of this paragraph characterizes example 25 of the subject matter, disclosed herein, where example 25 also encompasses any one of examples 1 to 24, above.

Clutch-pack engagement spring 124, being within output clutch drum 114, provides for the reduction in the overall size of clutch assembly 110 by utilizing space within output clutch drum 114 for placement of components. Additionally, clutch-pack engagement spring 124, being within output clutch drum 114, helps protect and shield clutch-pack engagement spring 124.

Referring generally to FIG. 1 and particularly to, e.g., FIGS. 2-4 for illustrative purposes only and not by way of limitation, output clutch drum 114 is slidable relative to output shaft 104 along central axis 172 and is in direct contact with output shaft 104. The preceding content of this paragraph characterizes example 26 of the subject matter, disclosed herein, where example 26 also encompasses any one of examples 1 to 25, above.

Output clutch drum 114, being slidable relative to output shaft 104 and in direct contact with output shaft 104, promotes co-rotational coupling between output clutch drum 114 and output shaft 104.

Referring generally to FIG. 1 and particularly to, e.g., FIGS. 2-4 for illustrative purposes only and not by way of limitation, clutch piston 120 is selectively movable relative to output shaft 104 along central axis 172 and is in direct contact with output shaft 104. The preceding content of this paragraph characterizes example 27 of the subject matter, disclosed herein, whereby example 27 also encompasses any one of examples 1 to 26, above.

Clutch piston 120, being selectively movable relative to output shaft 104 and in direct contact with output shaft 104, promotes co-rotational coupling between clutch piston 120 and output shaft 104.

In one or more examples, output shaft 104 includes splines that engage corresponding splines on clutch piston 120 to facilitate translational movement of clutch piston 120 relative to output shaft 104 and co-rotation of clutch piston 120 and output shaft 104.

Referring generally to FIG. 1 and particularly to, e.g., FIGS. 2-4 for illustrative purposes only and not by way of limitation, clutch assembly 110 further comprises input-output bearing 170, interposed between input shaft 102 and output shaft 104 and configured to enable relative rotational motion between input shaft 102 and output shaft 104 when output clutch drum 114 is in the fully disengaged position relative to input clutch drum 112. The preceding content of this paragraph characterizes example 28 of the subject matter, disclosed herein, where example 28 also encompasses any one of examples 1 to 27, above.

Input-output bearing 170 promotes relative rotational motion, about central axis 172, between input shaft 102 and output shaft 104 when output clutch drum 114 is in the fully disengaged position by reducing friction between input shaft 102 and output shaft 104. In one or more examples, input-output bearing 170 engages output shaft 104 at an input end of output shaft 104, such that clutch pack 122 is interposed between input-output bearing 170 and output clutch drum 114, to promote concentricity of output shaft 104 relative to input shaft 102.

Referring generally to FIG. 1 and particularly to, e.g., FIGS. 2-4 for illustrative purposes only and not by way of limitation, input shaft 102 overlaps output shaft 104 along central axis 172 of input shaft 102 to define an overlapping region between input shaft 102 and output shaft 104. Input-output bearing 170 is located within the overlapping region. The preceding content of this paragraph characterizes example 29 of the subject matter, disclosed herein, where example 29 also encompasses example 28, above.

Input-output bearing 170, being located within the overlapping region, promotes concentricity of output shaft 104 relative to input shaft 102.

Referring generally to FIG. 1 and particularly to, e.g., FIGS. 2-4 for illustrative purposes only and not by way of limitation, output shaft 104 comprises output-shaft splines 174. Output clutch drum 114 comprises output-clutch-drum splines 176. Output-shaft splines 174 and output-clutch-drum splines 176 mesh to prevent rotation of output clutch drum 114 relative to output shaft 104 and to enable translational movement of output clutch drum 114 relative to output shaft 104 along central axis 172. The preceding content of this paragraph characterizes example 30 of the subject matter, disclosed herein, where example 30 also encompasses any one of examples 1 to 29, above.

Meshing of output-shaft splines 174 and output-clutch-drum splines 176 provides robust mechanical co-rotational and translatable coupling between output shaft 104 and output clutch drum 114.

Figure 5:
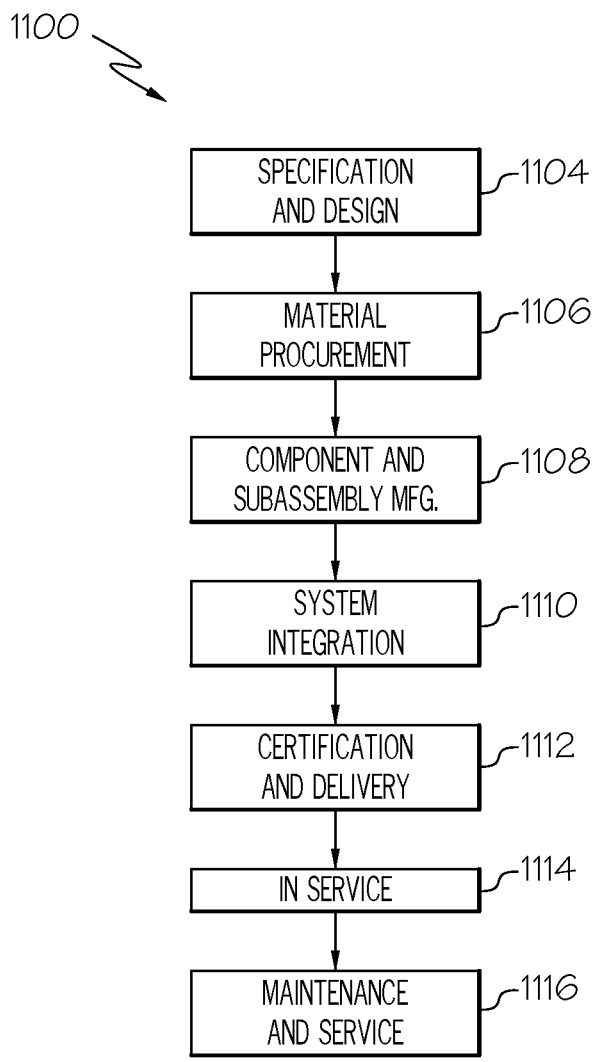
FIG. 5 is a block diagram of aircraft production and service methodology.
Figure 6:
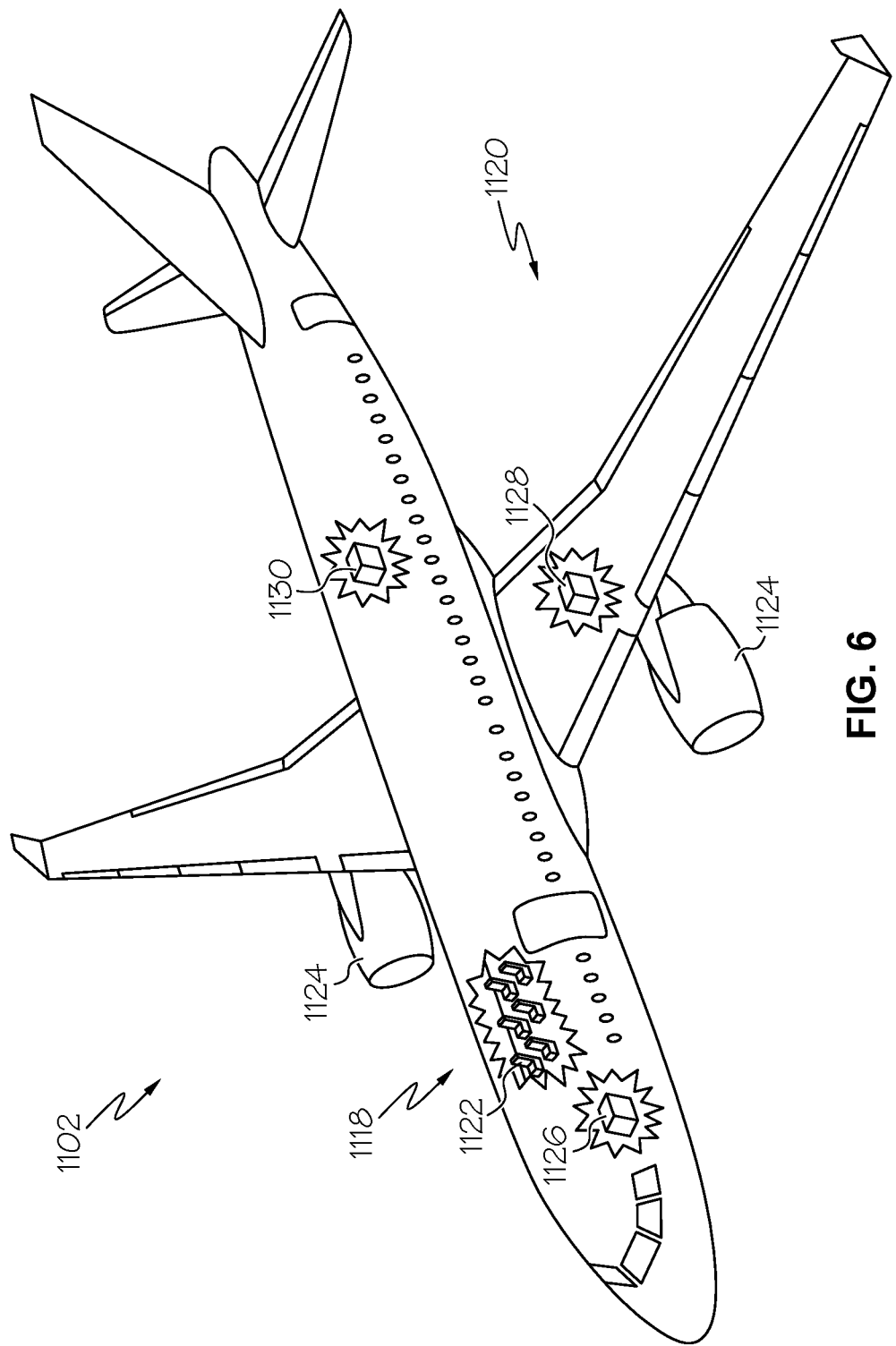
FIG. 6 is a schematic illustration of an aircraft.

Examples of the subject matter, disclosed herein may be described in the context of aircraft manufacturing and service method 1100 as shown in FIG. 5 and aircraft 1102 as shown in FIG. 6. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples, set forth herein, will come to mind to one skilled in the art, to which the present disclosure pertains, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A clutch assembly, comprising:
   an input shaft, having a central axis;
   an output shaft, co-axially arranged relative to the input shaft;
   an input clutch drum, comprising external splines, and wherein the input clutch drum is fixed to the input shaft so that the input clutch drum is neither rotatable nor translatable relative to the input shaft;
   an output clutch drum, comprising internal splines, and wherein the output clutch drum is selectively translatable relative to the output shaft and is not rotatable relative to the output shaft;
   a clutch pack, comprising:
      first plates, selectively translatable relative to the input shaft and not rotatable relative to the input shaft; and
      second plates, selectively translatable relative to the output shaft and not rotatable relative to the output shaft;
   a clutch piston, not rotatable relative to the output shaft and selectively translatable relative to the output shaft between, inclusively, a frictionally disengaged clutch-pack position and a frictionally engaged clutch-pack position;
   a linear actuator, operable to translate the output clutch drum relative to the input clutch drum; and
   a clutch-pack engagement spring, interposed between the output clutch drum and the clutch piston; and
   wherein:
      the output clutch drum is selectively translatable relative to the input clutch drum between, inclusively, a fully disengaged position, in which the internal splines of the output clutch drum are not in mesh with the external splines of the input clutch drum and the first plates of the clutch pack are not frictionally coupled with the second plates of the clutch pack, and, inclusively, a positively engaged position, in which the internal splines of the output clutch drum are in mesh with the external splines of the input clutch drum and the first plates of the clutch pack are frictionally coupled with the second plates of the clutch pack;
      when the clutch piston is in the frictionally disengaged clutch-pack position, the first plates of the clutch pack are not frictionally coupled with the second plates of the clutch pack and the internal splines of the output clutch drum are not in mesh with the external splines of the input clutch drum;
      when the clutch piston is in the frictionally engaged clutch-pack position, the first plates of the clutch pack are frictionally coupled with the second plates of the clutch pack;
      the linear actuator comprises a motor and a second motor;
      the motor is coupled with the output clutch drum and is selectively operable to translate the output clutch drum relative to the output shaft in a first direction along the central axis and to translate the output clutch drum relative to the output shaft in a second direction along the central axis;
      the second motor is coupled with the output clutch drum and is selectively operable to translate the output clutch drum relative to the output shaft in the first direction along the central axis and to translate the output clutch drum relative to the output shaft in the second direction along the central axis;
      the first direction and the second direction are opposite to each other;
      the motor and the second motor are only operable synchronously with each other;
      the linear actuator comprises:
         a carriage, selectively translatable relative to the output shaft;
         a driven gear, selectively rotatable relative to the carriage and coupled to the carriage so that rotation of the driven gear relative to the carriage translates the carriage relative to the output shaft;
         a drive gear, in mesh with the driven gear; and
         a second drive gear, in mesh with the driven gear;
      the output clutch drum is rotatable relative to the carriage;
      the motor is operable to rotate the drive gear;
      the second motor is operable to rotate the second drive gear;
      the motor is operable so that the driven gear is rotated by the drive gear in either a first rotational direction or in a second rotational direction;
      the second drive gear is configured to be rotated by the driven gear; and
      the drive gear and the second drive gear are configured to rotate in identical directions.

2. The clutch assembly according to claim 1, wherein, when the output clutch drum is in the fully disengaged position relative to the input clutch drum, the clutch piston is in the frictionally disengaged clutch-pack position.

3. The clutch assembly according to claim 2, wherein, when the output clutch drum is in the positively engaged position relative to the input clutch drum, the clutch-pack engagement spring is compressed between the output clutch drum and the clutch piston, and the clutch piston is in the frictionally engaged clutch-pack position.

4. The clutch assembly according to claim 3, wherein:
   the output clutch drum is selectively translatable relative to the input clutch drum into an intermediate position between the fully disengaged position relative to the input clutch drum and the positively engaged position relative to the input clutch drum; and
   when the output clutch drum is in the intermediate position:
      the internal splines of the output clutch drum are not in mesh with the external splines of the input clutch drum; and the clutch piston is in the frictionally engaged clutch-pack position.

5. The clutch assembly according to claim 4, wherein:
when the output clutch drum is in the intermediate position, the clutch-pack engagement spring is compressed a first amount between the output clutch drum and the clutch piston;
when the output clutch drum is in the positively engaged position relative to the input clutch drum, the clutch-pack engagement spring is compressed a second amount between the output clutch drum and the clutch piston; and
the second amount is greater than the first amount.

6. The clutch assembly according to claim 4, wherein the clutch piston is in the frictionally engaged clutch-pack position when the output clutch drum is between, inclusively, the intermediate position relative to the input clutch drum and, inclusively, the positively engaged position relative to the input clutch drum.

7. The clutch assembly according to claim 4, wherein the clutch piston is in the frictionally disengaged clutch-pack position when the output clutch drum is between, exclusively, the intermediate position relative to the input clutch drum and, inclusively, the fully disengaged position relative to the input clutch drum.

8. The clutch assembly according to claim 1, wherein:
the motor is selectively operable to:
rotate the drive gear so that the driven gear is rotated in the first rotational direction and the carriage is translated relative to the output shaft in the first direction along the central axis; and
rotate the drive gear so that the driven gear is rotated in the second rotational direction and the carriage is translated relative to the output shaft in the second direction along the central axis;
the second motor is selectively operable to:
rotate the second drive gear so that the driven gear is rotated in the first rotational direction and the carriage is translated relative to the output shaft in the first direction along the central axis; and
rotate the second drive gear so that the driven gear is rotated in the second rotational direction and the carriage is translated relative to the output shaft in the second direction along the central axis; and
the first rotational direction and the second rotational direction are opposite to each other.

9. The clutch assembly according to claim 1, further comprising a bearing, interposed between the carriage and the output clutch drum and configured to enable rotation of carriage relative to the output clutch drum.

10. The clutch assembly according to claim 1, wherein the linear actuator is selectively operable to translate the output clutch drum between, inclusively, the fully disengaged position relative to the input clutch drum and, inclusively, the positively engaged position relative to the input clutch drum.

11. The clutch assembly according to claim 1, wherein, when the output clutch drum translates relative to the output shaft from the fully disengaged position relative to the input clutch drum to the positively engaged position relative to the input clutch drum, the clutch piston translates relative to the output shaft from the frictionally disengaged clutch-pack position to the frictionally engaged clutch-pack position.

12. The clutch assembly according to claim 1, further comprising a clutch-pack disengagement spring, interposed between the clutch piston and the output shaft along the central axis and configured to apply a first biasing force to the clutch piston in the first direction along the central axis, wherein the clutch-pack engagement spring is configured to apply a second biasing force to the clutch piston in the second direction along the central axis, opposite the first direction.

13. The clutch assembly according to claim 12, wherein:
when the output clutch drum is in the fully disengaged position relative to the input clutch drum, the first biasing force is greater than the second biasing force;
when the clutch piston is in the frictionally engaged clutch-pack position, the first biasing force is less than the second biasing force by a first amount;
when the output clutch drum is in the positively engaged position relative to the input clutch drum, the first biasing force is less than the second biasing force by a second amount; and
the first amount is less than the second amount.

14. The clutch assembly according to claim 12, wherein:
the input shaft comprises an input-shaft hub, which comprises input-shaft-hub splines;
the input-shaft-hub splines are engaged with the first plates of the clutch pack to prevent rotation of the first plates relative to the input shaft;
the output shaft comprises an output-shaft hub, which comprises output-shaft-hub splines;
the output-shaft-hub splines are engaged with the second plates of the clutch pack to prevent rotation of the second plates relative to the output clutch drum; and
the clutch-pack disengagement spring is interposed between the clutch piston and the output-shaft hub of the output shaft.

15. A clutch assembly, comprising:
an input shaft, having a central axis;
an output shaft, co-axially arranged relative to the input shaft;
an input clutch drum, comprising external splines, and wherein the input clutch drum is fixed to the input shaft so that the input clutch drum is neither rotatable nor translatable relative to the input shaft;
an output clutch drum, comprising internal splines, and wherein the output clutch drum is selectively translatable relative to the output shaft and is not rotatable relative to the output shaft;
a clutch pack, comprising:
first plates selectively translatable relative to the input shaft and not rotatable relative to the input shaft; and
second plates, selectively translatable relative to the output shaft and not rotatable relative to the output shaft;
a clutch piston, not rotatable relative to the output shaft and selectively translatable relative to the output shaft between, inclusively, a frictionally disengaged clutch-pack position and a frictionally engaged clutch-pack position;
a linear actuator, operable to translate the output clutch drum relative to the input clutch drum; and
a clutch-pack engagement spring, interposed between the output clutch drum and the clutch piston;
wherein:
the output clutch drum is selectively translatable relative to the input clutch drum between, inclusively, a fully disengaged position, in which the internal splines of the output clutch drum are not in mesh with the external splines of the input clutch drum and the first plates of the clutch pack are not frictionally coupled with the second plates of the clutch pack, and, inclusively, a positively engaged position, in which the internal splines of the output clutch drum are in mesh with the external splines of the input clutch drum and the first plates of the clutch pack are frictionally coupled with the second plates of the clutch pack;

when the clutch piston is in the frictionally disengaged clutch-pack position, the first plates of the clutch pack are not frictionally coupled with the second plates of the clutch pack and the internal splines of the output clutch drum are not in mesh with the external splines of the input clutch drum;

when the clutch piston is in the frictionally engaged clutch-pack position, the first plates of the clutch pack are frictionally coupled with the second plates of the clutch pack;

the linear actuator comprises a motor and a second motor;

the motor is coupled with the output clutch drum and is selectively operable to translate the output clutch drum relative to the output shaft in a first direction along the central axis;

the second motor is coupled with the output clutch drum and is selectively operable to translate the output clutch drum relative to the output shaft in a second direction along the central axis;

the first direction and the second direction are opposite to each other;

the motor and the second motor are only operable asynchronously with each other;

the linear actuator comprises:
  a carriage, selectively translatable relative to the output shaft;
  a driven gear, selectively rotatable relative to the carriage and coupled to the carriage so that rotation of the driven gear relative to the carriage translates the carriage relative to the output shaft;
  a drive gear, in mesh with the driven gear; and
  a second drive gear, in mesh with the driven gear;

the output clutch drum is not translatable relative to the carriage of the linear actuator and is rotatable relative to the carriage;

the motor is operable to rotate the drive gear;

the second motor is operable to rotate the second drive gear;

the motor is operable so that the driven gear is rotated by the drive gear in either a first rotational direction or in a second rotational direction;

the second drive gear is configured to be rotated by the driven gear; and the drive gear and the second drive gear are configured to rotate in identical directions.

16. The clutch assembly according to claim 15, wherein, when the output clutch drum is in the fully disengaged position relative to the input clutch drum, the clutch piston is in the frictionally disengaged clutch-pack position.

17. The clutch assembly according to claim 15, further comprising a clutch-pack disengagement spring, interposed between the clutch piston and the output shaft along the central axis and configured to apply a first biasing force to the clutch piston in the first direction along the central axis, wherein the clutch-pack engagement spring is configured to apply a second biasing force to the clutch piston in the second direction along the central axis, opposite the first direction.

18. A clutch assembly, comprising:
an input shaft, having a central axis;
an output shaft, co-axially arranged relative to the input shaft;
an input clutch drum, comprising external splines, and wherein the input clutch drum is fixed to the input shaft so that the input clutch drum is neither rotatable nor translatable relative to the input shaft;
an output clutch drum, comprising internal splines, and wherein the output clutch drum is selectively translatable relative to the output shaft and is not rotatable relative to the output shaft;
a clutch pack, comprising:
  first plates, selectively translatable relative to the input shaft and not rotatable relative to the input shaft; and
  second plates, selectively translatable relative to the output shaft and not rotatable relative to the output shaft;
a clutch piston, not rotatable relative to the output shaft and selectively translatable relative to the output shaft between, inclusively, a frictionally disengaged clutch-pack position and a frictionally engaged clutch-pack position;
a linear actuator, operable to translate the output clutch drum relative to the input clutch drum; and
a clutch-pack engagement spring, interposed between the output clutch drum and the clutch piston; and
wherein:
  the output clutch drum is selectively translatable relative to the input clutch drum between, inclusively, a fully disengaged position, in which the internal splines of the output clutch drum are not in mesh with the external splines of the input clutch drum and the first plates of the clutch pack are not frictionally coupled with the second plates of the clutch pack, and, inclusively, a positively engaged position, in which the internal splines of the output clutch drum are in mesh with the external splines of the input clutch drum and the first plates of the clutch pack are frictionally coupled with the second plates of the clutch pack;
  when the clutch piston is in the frictionally disengaged clutch-pack position, the first plates of the clutch pack are not frictionally coupled with the second plates of the clutch pack and the internal splines of the output clutch drum are not in mesh with the external splines of the input clutch drum;
  when the clutch piston is in the frictionally engaged clutch-pack position, the first plates of the clutch pack are frictionally coupled with the second plates of the clutch pack;
  the linear actuator comprises a motor and a second motor;
  the second motor is coupled with the output clutch drum and is selectively operable to translate the output clutch drum relative to the output shaft;
  the motor is coupled with the output clutch drum and, when the second motor is disabled, is selectively operable to translate the output clutch drum relative to the output shaft in a first direction along the central axis and to translate the output clutch drum relative to the output shaft in a second direction along the central axis;
  the first direction and the second direction are opposite to each other;
  the linear actuator comprises:
    a carriage, selectively translatable relative to the output shaft;
    a driven gear, selectively rotatable relative to the carriage and coupled to the carriage so that rotation of the driven gear relative to the carriage translates the carriage relative to the output shaft;
a drive gear, in mesh with the driven gear; and
a second drive gear, in mesh with the driven gear;
the output clutch drum is not translatable relative to the carriage of the linear actuator and is rotatable relative to the carriage;
the motor is operable to rotate the drive gear;
the second motor is operable to rotate the second drive gear;
the motor is operable so that the driven gear is rotated by the drive gear in either a first rotational direction or in a second rotational direction;
the second drive gear is configured to be rotated by the driven gear; and
the drive gear and the second drive gear are configured to rotate in identical directions.

19. The clutch assembly according to claim 18, wherein, when the output clutch drum is in the fully disengaged position relative to the input clutch drum, the clutch piston is in the frictionally disengaged clutch-pack position.

20. The clutch assembly according to claim 18, further comprising a clutch-pack disengagement spring, interposed between the clutch piston and the output shaft along the central axis and configured to apply a first biasing force to the clutch piston in the first direction along the central axis, wherein the clutch-pack engagement spring is configured to apply a second biasing force to the clutch piston in the second direction along the central axis, opposite the first direction.

* * * * *